United States Patent [19]

Shirasawa et al.

[11] Patent Number: 5,613,214
[45] Date of Patent: Mar. 18, 1997

[54] MOBILE COMMUNICATION TERMINAL AUTHENTICATING SYSTEM

[75] Inventors: Susumu Shirasawa; Kenichiro Kamachi; Hiroyuki Tomoike, all of Tokyo, Japan

[73] Assignee: NEC Corporation, Tokyo, Japan

[21] Appl. No.: 324,614

[22] Filed: Oct. 18, 1994

[30] Foreign Application Priority Data

Oct. 18, 1993 [JP] Japan .................................. 5-282089

[51] Int. Cl.$^6$ ............................... H04B 1/00; H04K 1/00
[52] U.S. Cl. ................... 455/54.1; 455/53.1; 455/54.2; 379/62; 380/23; 380/25; 340/825.31; 340/825.34
[58] Field of Search .................. 380/23, 25; 340/825.34, 340/825.31, 825.44; 379/62, 63, 59; 455/54.1, 54.2, 53.1, 33.1

[56] References Cited

U.S. PATENT DOCUMENTS

| | | | |
|---|---|---|---|
| 5,233,655 | 8/1993 | Shapiro | 380/23 |
| 5,239,294 | 8/1993 | Flanders et al. | 340/825.34 |
| 5,241,598 | 8/1993 | Raith | 380/21 |
| 5,329,591 | 7/1994 | Magrill | 380/25 |
| 5,390,245 | 2/1995 | Dent et al. | 380/23 |

FOREIGN PATENT DOCUMENTS 2-224425  9/1990  Japan .

*Primary Examiner*—Andrew I. Faile
*Assistant Examiner*—Lee Nguyen
*Attorney, Agent, or Firm*—Foley & Lardner

[57] ABSTRACT

A mobile communication terminal authenticating system for renewing an authenticating key without transmitting the authenticating key between the mobile communication terminal and the mobile communication network is provided. In the mobile communication terminal 1, a calculating circuit 1c executes a calculation F on the basis of a random number generated by a PN (Pseudo Noise) oscillator 3a of a switching center 3 and an authenticating key held by a memory 1b, and its calculating result is transmitted to the switching center 3. In the switching center 3, a comparator 3c compares its calculating result with a result of the calculation F executed on the basis of the random number and the authenticating key received from the home location register 4 by a calculating circuit 3b. If the two calculating results coincide with each other, the authenticating key renewal instruction is transmitted from the control circuit 3d to the mobile communication terminal 1. In the mobile communication terminal 1, a calculating circuit 1d executes a calculation G on the basis of the random number and the authenticating key, and its calculating result is stored in the memory 1b as a new authenticating key. Likewise, the calculating circuit 3e of the switching center 3 executes the calculation G so that the authenticating key of the home location register 4 is renewed.

5 Claims, 3 Drawing Sheets

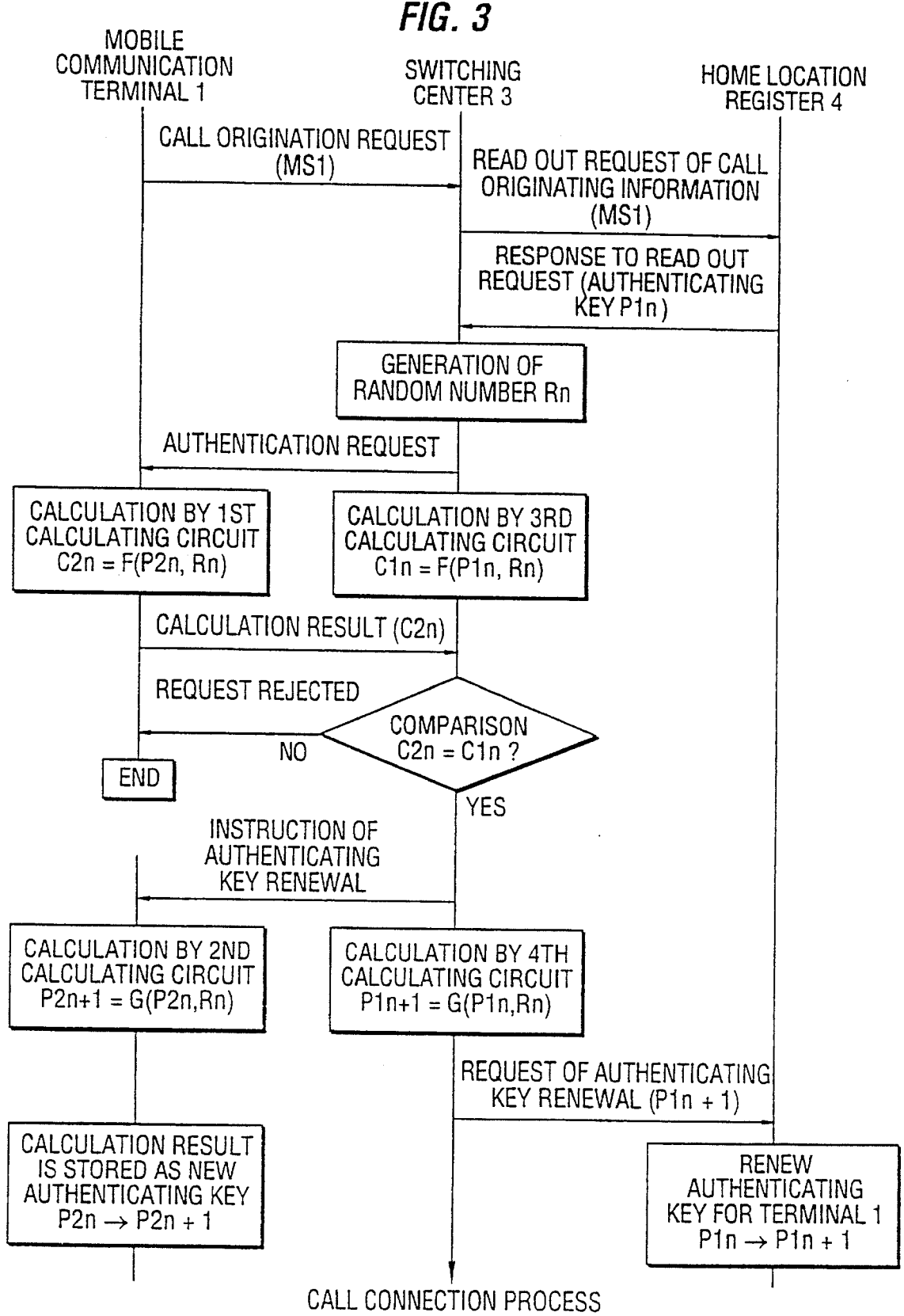

MOBILE COMMUNICATION TERMINAL AUTHENTICATING SYSTEM

BACKGROUND OF THE INVENTION

1. Field of the Invention

This invention relates to a mobile communication terminal authenticating system for authenticating a mobile communication terminal to be used in a mobile communication network, represented by the cellular telecommunication system, and for determining whether the terminal is an authorized terminal which has been registered in that mobile communication network.

2. Description of the Related Art

In a mobile communication system, a mobile communication terminal communicates with a mobile communication network which includes at least a base station and a switching center through a radio channel. Since the radio channel is used, there is a risk that tapping, copying of a terminal identification number or the like are readily made, and in order to prevent unauthorized use by such a mobile communication terminal prepared by the above-mentioned illegal method, an authenticating process is required so as to confirm whether or not the mobile communication terminal which requests a call origination is an authorized terminal which has been registered in that mobile communication network.

FIG. 1 is a block diagram showing a configuration of a mobile communication system using a conventional mobile communication terminal authenticating system.

Reference numeral 10 denotes a configuration of a mobile communication terminal; 10a, a radio transmitter-receiver for communicating with a base station 20 of a mobile communication network through a radio channel; 10b, a memory for storing an authenticating key corresponding to a secret number necessary for preventing unauthorized use; and 10c, a calculating circuit for executing a calculating process on the basis of the secret number and a random number to be described later.

A mobile communication network with which the mobile communication terminal 10 contracts for subscription includes a base station 20 for communicating with the mobile communication terminal 10, a switching center 30 for switching a connection between the mobile communication terminal 10 and other fixed telecommunication networks, and a home location register 40 for storing contracted subscribers' information, authenticating keys, call processing information, and the like. The switching center 30 includes a PN (Pseudo Noise) oscillator 30a for generating random numbers used for an authenticating process for every call request, a calculating circuit 30b for executing a calculating process on the basis of the random numbers outputted from the PN oscillator 30a and the authenticating keys stored in the home location register, a comparator 30c for comparing the result outputted from the calculating circuit 30b with the calculating results received from the mobile communication terminal 10 through the base station 20, and a control circuit 30d for executing a call connecting process on the basis of the result of the comparator 30c.

The home location register 40 is located in another switching center (home memory station) (not shown) constituting the mobile communication network.

The switching center 30 accesses the home location register 40 in response to a call request for communication from the mobile communication terminal 10 so that it can obtain service information, call processing information, authenticating information or the like, as to the mobile communication terminal 10.

Now, an operation of the authenticating process for authenticating whether or not the mobile communication terminal 10 is an authorized terminal in such a mobile communication system will be described.

First, when the mobile communication terminal 10 transmits a call originating request to the mobile communication network, the call originating request is received by the switching center 30 through the base station 20, and the switching center 30 activates the PN oscillator 30a therein to generate a random number. Then, the random number is transmitted to the mobile communication terminal 10 through the base station 20.

Subsequently, the radio transmitter-receiver 10a within the mobile communication terminal 10 receives the random number transmitted from the mobile communication network to output the random numbers to the calculating circuit 10c. The calculating circuit 10c executes calculation on the basis of the random number and the authenticating key stored in the memory 10b, and the radio transmitter-receiver 10a transmits this calculation result to the mobile communication network.

On the other hand, the calculating circuit 30b within the switching center 30 executes the calculation of the same algorithm as that of the calculating circuit 10c provided in the mobile communication terminal 10 on the basis of the random number which has been previously outputted from the PN oscillator 30a and the authenticating key of the mobile communication terminal 10, which has been stored in the home location register 40. Then, the comparator 30c compares the calculation result transmitted from the mobile communication terminal 10 with the calculation result outputted from the calculating circuit 30b.

As a result of the comparison by the comparator 30c, if those two calculation results coincide with each other, the control circuit 30d judges that the mobile communication terminal which has requested the call origination is an authorized terminal and executes a call connecting process with the mobile communication terminal 10, and if they do not coincide with each other, the control circuit 30d judges that it is an unauthorized terminal and rejects the call request. With the above processes, the authenticating process has been completed.

The above-mentioned mobile communication terminal authenticating system is an authenticating system in which the same authenticating key stored in the mobile communication terminal and the home location register, respectively, are used for calculating by the calculating circuit 10c of the mobile communication terminal and the calculating circuit 30b of the switching center having the same calculating algorithm, respectively, so that these results are compared to judge the authorization of the mobile communication terminal.

However, if a mobile communication terminal copying the calculating circuit and authenticating key illegally, which are commonly stored both in the mobile communication terminal 10 and the home location register 40 of the mobile communication network, is used, the above authenticating system cannot recognize whether the mobile communication terminal 10 is an authorized terminal or not.

The mobile communication system disclosed in Japanese Patent Unexamined Publication No. 2-224425 is an authenticating system in which the mobile communication network notifies new authenticating key to be used at a next time to the mobile communication terminal for every call so that the authenticating key is renewed and held in both the mobile communication network and the mobile communication terminal for every call.

According to this system, if the unauthorized mobile communication terminal which has copied an authorized terminal including the authenticating key makes a call, the authenticating key is renewed in both the mobile communication network and the unauthorized terminal, but the authenticating key in the authorized terminal is not renewed. Therefore, since the authenticating keys do not coincide with each other when the authorized terminal makes a call request at the next time, a subscriber can recognize the existence of unauthorized terminal at an early stage.

The technique similar to that in which the authenticating key is changed for every call is also disclosed as "Method and apparatus for authentication and protection of subscribers in telecommunication systems" in U.S. Pat. No. 5,239,294.

However, in such a mobile communication system, because an authenticating key to be used at a next time is transmitted through a radio channel from the mobile communication network to the mobile communication terminal, if the unauthorized terminal can intercept a next authenticating key again transmitted from the mobile communication network, the authenticating key can be renewed. As a result, the unauthorized terminal can enjoy the mobile communication service illegally again.

Since the conventional mobile communication terminal authenticating system executes the above-mentioned authenticating process, in the authenticating system which judges the authorization of the terminal by calculating the same authenticating key to verify its result, there arises a problem that, even though an unauthorized terminal which has copied the authenticating key and the calculating circuit exists, the mobile communication network cannot recognize the existence of the unauthorized terminal.

Also, in the authenticating system in which the authenticating key is renewed in both the mobile communication network and the mobile Communication terminal for every call, there arises a problem that, since the authenticating key to be used at a next time is transmitted through a radio channel from the mobile communication network to the terminal, even though the unauthorized terminal can be temporarily removed, the unauthorized terminal can enjoy the mobile communication service again if the unauthorized terminal intercepts the next authenticating key.

SUMMARY OF THE INVENTION

The present invention has been achieved to solve the above problems, and an object of the invention is to provide a mobile communication terminal authenticating system which is capable of preventing the illegal use of the mobile communication system by renewing an authenticating key stored in a terminal and a mobile communication network without the transmission of such an authenticating key.

In order to achieve the above object, the present invention provides a mobile communication terminal authenticating system which includes a mobile communication terminal which executes a first calculation on the basis of a random number received and an authenticating key stored to transmit its result and executes a second calculation on the basis of the random number and the authenticating key when receiving an authenticating key renewal instruction to store its result as a new authenticating key; and a mobile communication network which generates a random number to transmit the random number to the mobile communication terminal and executes a first calculation on the basis of the random number and the authenticating key stored, and transmits the authenticating key renewal instruction to the mobile communication terminal when that result coincides with a result transmitted from the mobile communication terminal, and executes a second calculation on the basis of the random number and the authenticating key to store its result as a new authenticating key.

Also, the mobile communication terminal includes a radio transmitter-receiver for communicating with the mobile communication network, a memory for storing the authenticating key, a first calculating circuit for executing the first calculation on the basis of the random number which is received through the radio transmitter-receiver and the authenticating key outputted from the memory to output its result to the radio transmitter-receiver, and a second calculating circuit for executing a second calculation on the basis of the random number and the authenticating key when receiving the authenticating key renewal instruction through the radio transmitter-receiver to store its result as the new authenticating key. The mobile communication network includes a radio base station for communicating with the mobile communication terminal, a home location register for storing the authenticating key, and a mobile communication switching center for executing a switching operation. The mobile communication switching center includes an oscillator for generating random numbers to output them to the radio base station, a third calculating circuit for executing the first calculation on the basis of the random number and the authenticating key outputted from the home location register, a comparator for comparing the result from the third calculating circuit with the calculating result which is received by the mobile communication terminal through the radio base station, a control circuit which outputs the authenticating key renewal instruction to the radio base station when the results of the third calculating circuit coincides with the calculating result, and a fourth calculating circuit for executing the second calculation on the basis of the random number and the authenticating key to store its result as a new authenticating key in the home location register.

According to the invention, the random number is transmitted from the mobile communication network, the first calculation is executed on the basis of the random number received by the mobile communication terminal and the authenticating key stored, its calculating result is transmitted to the mobile communication network, and that calculating result is compared with a result of the first calculation executed on the basis of the random number and the authenticating key in the mobile communication network. Then, when the results of comparison coincides with each other, the authenticating key renewal instruction is transmitted from the mobile communication network, and the second calculation is executed on the basis of the random number and the authenticating key by the mobile communication terminal to store this result as a new authenticating key, and the second calculation is executed likewise in the mobile communication network to thereby renew the authenticating key.

Also, the random number is transmitted from the oscillator through the radio base station, and the first calculation is executed on the basis of the random number received and the authenticating key stored in the memory by the first calculating circuit, and its calculating result is transmitted to the mobile communication network through the radio transmitter-receiver and is compared with a result of the first calculation executed by the third calculating circuit on the basis of the random number and the authenticating key from the home location register by the comparator. Then, when the former coincides with the latter, the authenticating key renewal instruction is transmitted from the control circuit to the mobile communication terminal through the base station, and the second calculation is executed on the basis of the random number and the authenticating key by the second calculating circuit to store its result as the new authenticating key. The second calculation is executed likewise in the fourth calculating circuit to renew the authenticating key of the home location register.

BRIEF DESCRIPTION OF THE DRAWINGS

The present invention will be described in more detail with reference to the accompanying drawings, in which:

FIG. 3 is a diagram showing a procedure of an authenticating process in the mobile communication terminal authenticating system of FIG. 2.

DETAILED DESCRIPTION OF THE PREFERRED EMBODIMENTS

Figure 2:
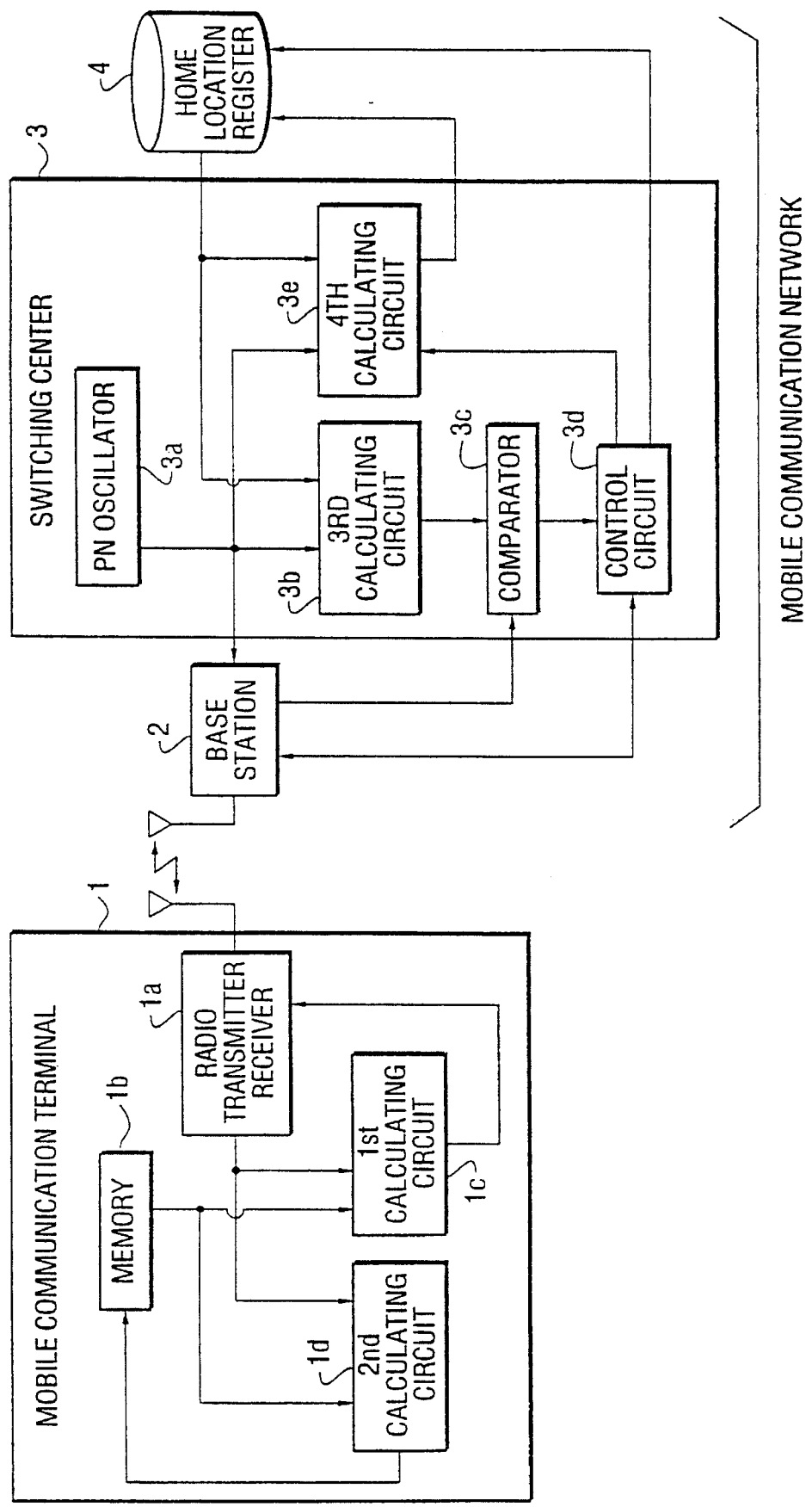
FIG. 2 is a block diagram showing a configuration of a mobile communication system using a mobile communication terminal authenticating system in accordance with one embodiment of the present invention.

FIG. 2 is a block diagram showing a configuration of a mobile communication system using a mobile communication terminal authenticating system in accordance with a first embodiment of the present invention, and FIG. 3 is a diagram showing a procedure of an authenticating process in the mobile communication terminal authenticating system.

In FIG. 2, reference numeral 1 denotes a configuration of a mobile communication terminal; 1a, a radio transmitter-receiver; 1b, a memory formed of a non-volatile memory, the contents of which are kept in store even when the power is interrupted, for storing an authenticating memory; 1c, a first calculating circuit for executing a first calculation on the basis of a random number received from a mobile communication network and an authenticating key stored in the memory 1b; and 1d, a second calculating circuit for executing a second calculation on the basis of the random number and the authenticating key to store its result as a new authenticating key in the memory 1b when receiving an authenticating key renewal instruction from the mobile communication network.

Reference numeral 2 denotes a base station; 3, a switching center; 3a, a PN oscillator; 3b, a third calculating circuit for executing the first calculation on the basis of the random number outputted from the PN oscillator 3a and the authenticating key stored in a home location register; 3c, a comparator for comparing a result of the third calculating circuit 3b with a calculating result received from the mobile communication terminal 1 through the base station 2.

Figure 1:
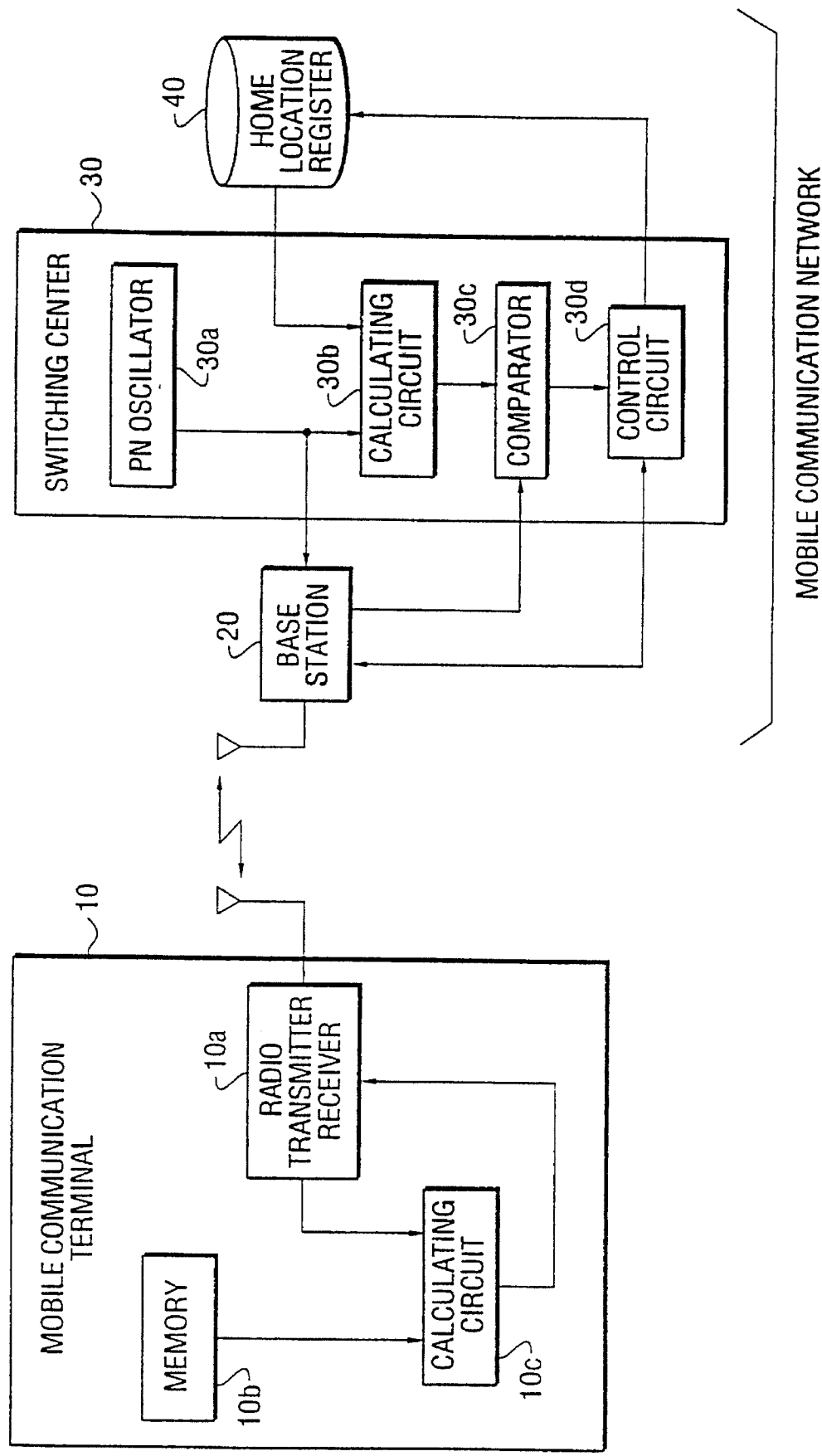
FIG. 1 is a block diagram showing a configuration of a mobile communication system using a conventional mobile communication terminal authenticating system.

Also, reference numeral 3d denotes a control circuit for outputting the authenticating key renewal instruction to the base station 2 to transmit the renewal instruction to the mobile communication terminal 1 when the comparison result of the comparator 3c represents a coincidence; 3e, a fourth calculating circuit for executing the second calculation on the basis of the random number and the authenticating key to store its result as a new authenticating key in the home location register when the above comparison result represents the coincidence; and 4, the home location register likewise in the example of FIG. 1.

The meanings of symbols in FIG. 3 representing a procedure of an authenticating process will be described.

Symbols P1n and P2n represent authenticating keys stored in the home location register 4 and the memory 1b, respectively; Rn, a random number generated by the PN oscillator 3a; C1n and C2n, the results of the first calculation F executed by the third calculating circuit 3b and the first calculating circuit 1c, respectively; and P1n+1 and P2n+1, new authenticating keys obtained from the results of the second calculation G executed by the fourth calculating circuit 3e and the second calculating circuit 1d, respectively.

Also, F (P1n, Rn) denotes the first calculation F based on the authenticating key P1n and the random number Rn, and G(P1n, Rn) is the second calculation G likewise.

Subsequently, an operation of an authenticating process for confirming whether or not the mobile communication terminal 1 is an authorized terminal in the above mobile communication system will be described.

First, the switching center 3 which has received a call origination request for communication from the mobile communication terminal 1 accesses the home location register 4 which stores call process information as to the mobile communication terminal 1 by using the control circuit 3d, and requests to-read out the call origination information of the mobile communication terminal 1 with a mobile station identity (MSI) of the mobile communication terminal 1 being contained in the received call origination request for communication being used as a key.

When the switching center 3 receives the authenticating key P1n of the mobile communication terminal 1 outputted from the home location register 4 as a response to the request for reading out the call origination information, the PN oscillator 3a generates the random number Rn. The random number Rn is transmitted from the base station 2 to the mobile communication terminal 1.

The calculating circuit 3b executes the calculation F on the basis of the random number Rn outputted from the PN oscillator 3a and the authenticating key P1n of the mobile communication terminal 1 read out from the home location register 4 to output its result C1n to the comparator 3c.

On the other hand, the radio transmitter-receiver 1a within the mobile communication terminal 1 receives the random number Rn transmitted from the switching center 3 through the base station 2 and outputs it to the calculating circuit 1c. The calculating circuit 1c executes the calculation F on the basis of the random number Rn and the authenticating key P2n stored in the memory 1b to output its result C2n to the radio transmitter-receiver 1a. This calculation result C2n is transmitted from the radio transmitter-receiver 1a to the switching center 3 through the base station 2.

Then, the comparator 3c within the switching center 3 compares the calculating result C1n outputted from the calculating circuit 3b with the calculating result C2n transmitted from the mobile communication terminal 1 to judge the authorization of the mobile communication terminal 1.

At this time, if the mobile communication terminal 1 is an authorized terminal, the authenticating key P1n stored in the home location register 4 must be identical with the authenticating key P2n stored in the terminal 1, and also since the calculating algorithms of the calculating circuit 3b in the switching center 3 and the calculating circuit 1c in the mobile communication terminal 1 are the same first calculation F, the calculating results C1n and C2n must be equal to each other.

Therefore, the control circuit 3d in the switching center 3 judges that the mobile communication terminal which has sent a call origination request for communication is of an authorized terminal if the two calculating results C1n and C2n coincide with each other as a result of the comparison due to the comparator 3c, and then the authenticating key renewal instruction is transmitted from the base station 2 to the mobile communication terminal 1.

If the two calculating results C1n and C2n do not coincide with each other as a result of the comparison, then the control circuit 3d judges that it is an unauthorized terminal, and transmits that the authentication was N.G.

The above operation is the same as that of the example in FIG. 1. Subsequently, in the mobile communication terminal 1 which has been judged as the authorized terminal, by receiving the authenticating key renewal instruction from the switching center 3 through the base station 2, the authenticating key P2n will be renewed as stated below.

That is, the calculating circuit 1d executes the calculation G on the basis of the previous random number Rn and the authenticating key P2n stored in the memory 1b to output its result of P2n+1 to the memory 1b, whereby the memory 1b renews the stored authenticating key P2n into the newly generated authenticating key P2n+1.

On the other hand, likewise in the switching center 3, the calculating circuit 3e executes the calculation G on the basis of the random number Rn and the authenticating key P1n to output its result to the home location register 4 as the authenticating key renewal request. Then, the home location register 4 renews the stored authenticating key P1n into the newly generated authenticating key P1n+1. With this, the authenticating process is completed, and the switching center 3 executes the call connection process for the call origination request for communication of the mobile communication terminal 1.

In this authenticating system, the authenticating key P1n stored in the home location register 4 is the same as the authenticating key P2n stored in the memory 1b within the mobile communication terminal 1, and the calculating algorithms of the calculating circuit 3 in the switching center 3 and the calculating circuit 1d in the mobile communication terminal 1 are the same calculation G, and therefore the newly generated authenticating keys P1n+1 and P2n+1 are also the same.

Then, in the next authenticating process for the mobile communication terminal 1, those authenticating keys P1n+1 and P2n+1 which have been renewed in this authenticating process will be used.

Consequently, since the authenticating keys P1n and P2n are renewed for every call, if the unauthorized terminal having the entirely same authenticating key makes a call once, the authenticating key P1n is renewed at the mobile communication network side, however, the authenticating key P2n of the authorized terminal 1 is not renewed as it is. Hence, since the authenticating key of the authorized terminal does not coincide with that of mobile communication network when the authorized terminal makes a call, the authorized subscriber can find out at an early stage that the unauthorized terminal exists.

Then, main information which is transmitted/received through a radio channel is the random number Rn which is changed in every call generated by the PN oscillator 3a and the calculating result C2n of the calculating circuit 1c, and the authenticating key necessary for preparing the unauthorized terminal is not directly transmitted, and the new authenticating key is generated by the calculation G using the random number Rn.

As a result, even though the terminal having the entirely same authenticating key or the like at a certain time is prepared, if the terminal fails to intercept the random number Rn which is transmitted from the mobile communication network at the time of subsequent call even once, the authenticating key of the unauthorized terminal is not renewed as it is even if the authenticating key P2n of the authorized terminal 1 and the authenticating key P1n of the home location register 4 are renewed. After that, it is extremely rare that the authenticating key of the unauthorized terminal coincides with the authenticating key P1n of the home location register 4.

According to the present invention, since the authenticating keys stored in the mobile communication terminal and the mobile communication network are renewed for every call, even if the unauthorized terminal having the entirely same authenticating key or the like exists, the existence of the unauthorized terminal can be found out at an early stage. Also, since the authenticating key is renewed by the second calculation using the random number without direct transmission of the authenticating key, the unauthorized terminal fails to intercept the random number, or the authenticating key is reset with a discovery of the illegal terminal. After that, it is extremely rare that the authenticating key of the unauthorized terminal coincides with that of the mobile communication network so that another illegal use by the unauthorized terminal can be prevented.

Further, the mobile communication terminal includes the radio transmitter-receiver, the memory, the first calculating circuit, and the second calculating circuit, and the mobile communication network includes the base station, the home location register as well as the switching center having the oscillator, the third calculating circuit, the comparator, the control circuit, and the fourth calculating circuit, thereby being capable of realizing the mobile communication terminal authenticating system which renews the authenticating key with the second calculation using the random number in every call without direct transmission of the authenticating keys stored in the mobile communication terminal and the mobile communication network.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed included therein.

What is claimed is:

1. A mobile communication authenticating system for authenticating a mobile communication terminal to be used in a mobile communication network having at least one base station for radio communication with said mobile communication terminal, a home location register configured to store information related to each mobile communication terminal and a switching center configured to switch each mobile communication call, said mobile communication terminal authenticating system comprising:

a first authenticating key being stored in said mobile communication terminal and said home location register respectively;

a random number generated by said switching center;

a first and a second calculating circuit respectively provided in said mobile communication terminal and said switching center for executing a first calculation on the basis of said random number and said first authenticating key;

a third and a fourth calculating circuit respectively provided in said mobile communication terminal and said switching center for executing a second calculation on the basis of said random number and said first authenticating key;

a calculation result signal sent by said mobile communication terminal to said switching center for indicating a result of said first calculation having been executed by said first calculation circuit;

a calculation instruction signal sent by said switching center to said mobile communication terminal for instructing said mobile communication terminal to execute said second calculation with said third calculation circuit when a result of said first calculation by said first and second calculating circuits coincide with each other; and a second authenticating key, provided based on a calculation result of said second calculation by said third and fourth calculating circuits, to be stored respectively in said mobile communication terminal and said switching center as an authenticating key for a subsequent authentication of said mobile communication terminal.

2. A mobile communication authenticating system for authenticating a mobile communication terminal to be used in a mobile communication network having at least one base station for radio communication with said mobile communication terminal, a home location register configured to store information related to each mobile communication terminal and a switching center configured to switch each mobile communication call, said mobile communication terminal authenticating system comprising:

said mobile communication terminal including,
a memory for storing a first authenticating key;
a first calculating circuit for executing a first calculation on the basis of a random number received from said mobile communication network and said first authenticating key stored in said memory, and for transmitting a result of said first calculation to said mobile communication network for comparison in said mobile communication network; and
a second calculating circuit for executing a second calculation on the basis of said random number and said first authenticating key in accordance with an authenticating key renewal instruction received from said mobile communication network, and for storing a result of said second calculation as an authenticating key for a subsequent authentication of said mobile communication terminal;

said home location register storing said first authenticating key;

said switching center including,
an oscillator for generating said random number;
a third calculating circuit for executing said first calculation on the basis of said random number generated from said oscillator and said first authenticating key stored in said home location register;
a fourth calculating circuit for executing said second calculation on the basis of said random number generated from said oscillator and said first authenticating key stored in said home location register;
a comparator for comparing a result of said third calculation circuit and the result of said first calculation circuit received from said mobile communication terminal; and a control circuit for transmitting said authenticating key renewal instruction to said mobile communication terminal when a comparing result of said comparator indicates a coincidence, for instructing said fourth calculating circuit to execute said second calculation and for storing a result of said second calculation by said fourth calculating circuit in said home location register as the authenticating key for the subsequent authentication of said mobile communication terminal.

3. A mobile communication authenticating system for authenticating a mobile communication terminal to be used in a mobile communication network having at least one base station for radio communication with said mobile communication terminal, a home location register configured to store information related to each mobile communication terminal and a switching center configured to switch each mobile communication call, said mobile communication terminal authenticating system comprising:

a memory, provided in said mobile communication terminal, and configured to store a first authenticating key, wherein said first authenticating key is also stored in said home location register;

a random number generator, provided in said switching center, and configured to generate a random number;

a first calculating circuit, provided in said mobile communication terminal, and configured to execute a first calculation on the basis of said random number received from said switching center and said first authenticating key obtained from said memory, said first calculating circuit outputting a first calculation result signal to said switching center, said first calculation result signal indicating a result of said first calculation executed in said mobile communication terminal;

a second calculating circuit, provided in said mobile communication terminal, and configured to execute a second calculation on the basis of said random number received from said switching center and said first authenticating key obtained from said memory;

a third calculating circuit, provided in said switching center, and configured to execute said first calculation on the basis of said random number received from said random number generator and said first authenticating key obtained from said home location register, said third calculating circuit beginning execution of said first calculation upon receipt of said first calculation result signal;

a fourth calculating circuit, provided in said switching center, and configured to execute said second calculation on the basis of said random number received from said random number generator and said first authenticating key obtained from said home location register; and a control circuit, provided in said switching center, and configured to instruct said mobile communication terminal to execute said second calculation when results of said first calculation executed by said first and second calculation circuits coincide with each other;

wherein a second authenticating key based on said second calculation provided by said second calculation circuit is stored in said memory of said mobile communication terminal as an authentication key for a subsequent call request from said mobile communication terminal, and said second authenticating key based on said fourth calculation provided by said fourth calculation circuit is stored in said home location register as said authentication key for authorizing said subsequent call request from said mobile communication terminal.

4. A mobile communication terminal authenticating system according to claim 2, wherein said oscillator is a pseudo-noise oscillator.

5. A method for providing authentication of a mobile communication terminal to be used in a mobile communication network having at least one base station for radio communication with said mobile communication terminal, a home location register for storing information related to each mobile communication terminal and a switching center for switching each mobile communication call, said method comprising the steps of:

a) sending a call origination request from said mobile communication terminal to said switching center;
   b) generating a random number at said switching center upon receipt of said call origination request;
   c) sending an authentication request from said switching center to said mobile communication terminal, said authentication request including said random number;
   d) performing a first calculation at said mobile communication terminal based on said random number received from said authentication request and a first authentication key stored in a memory at said mobile communication terminal;
   e) performing said first calculation at said switching center based on said random number and said first authentication key;
   f) sending a result of said first calculation at said mobile communication terminal to said switching center;
   g) comparing, at said switching center, a result of said first calculation performed at said switching center with the result of said first calculation received from said mobile communication terminal;
   h) if the result of the comparing step is non-equivalence, sending a non-authorization signal to said mobile communication unit;
   i) if the result of the comparing step is equivalence, performing the following steps;
      i1) performing a second calculation at said mobile communication terminal based on said random number received from said switching center and said first authentication key stored in said memory;
      i2) performing said second calculation at said switching center based on said random number received from said random number generator and said first authentication key received from said home location register;
      i3) storing a second authenticating key at said mobile communication terminal to be used for a subsequent calling request to said switching center, said second authenticating key being based on a result of said second calculation performed at said mobile communication terminal;
      i4) storing a third authenticating key in said home location register to be compared with said second authenticating key received from said mobile communication terminal for authenticating the subsequent calling request, said third authenticating key being based on a result of said second calculation performed at said switching center; and
      i5) authorizing the subsequent calling request at said switching center only when said second authenticating key is equivalent to said third authenticating key.

* * * * *